US006350306B1

(12) United States Patent
Tonelli et al.

(10) Patent No.: US 6,350,306 B1
(45) **Date of Patent: *Feb. 26, 2002**

(54) COATINGS BASED ON FLUOROPOLYETHERS

(75) Inventors: Claudio Tonelli; Stefano Turri; Massimo Scicchitano, all of Milan (IT)

(73) Assignee: Ausimont S.p.A., Milan (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/766,379

(22) Filed: Dec. 12, 1996

Related U.S. Application Data

(63) Continuation of application No. 08/379,175, filed on Jan. 27, 1995, now abandoned.

(30) Foreign Application Priority Data

Jan. 31, 1994 (IT) ........................................ MI94A0155

(51) Int. Cl.[7] ........................ C08G 65/00; C08G 65/32; C09D 171/02

(52) U.S. Cl. ............................ 106/287.26; 106/287.24; 106/287.28; 106/287.3; 568/615; 252/182.15

(58) Field of Search ..................... 568/615; 106/287.26, 106/287.24, 287.28, 287.3; 252/182.15

(56) References Cited

U.S. PATENT DOCUMENTS

| | | | | |
|---|---|---|---|---|
| 2,242,218 A | | 5/1941 | Auer | |
| 3,665,041 A | | 5/1972 | Sianesi et al. | |
| 3,715,378 A | | 2/1973 | Sianesi et al. | |
| 3,810,874 A | | 5/1974 | Mitsch et al. | |
| 4,782,130 A | * | 11/1988 | Re | 528/70 |
| 4,849,493 A | * | 7/1989 | Re | 252/182.15 |
| 4,863,986 A | * | 9/1989 | Re | 528/70 |
| 5,959,058 A | * | 9/1999 | Tonelli et al. | 528/70 |

FOREIGN PATENT DOCUMENTS

| | | |
|---|---|---|
| EP | 0 098 699 A1 | 1/1984 |
| EP | 0 148 482 A2 | 7/1985 |
| EP | 0 239 123 A2 | 9/1987 |
| EP | 0 533 159 A1 | 3/1993 |
| EP | 0 548 745 A2 | 6/1993 |
| EP | 0 622 353 A3 | 11/1994 |
| EP | 0 622 391 A2 | 11/1994 |

OTHER PUBLICATIONS

Dahm, Et Al., "PCI Paints and Coatings", *Polyurethane Handbook*, G. Oertel (ed), Hanser Publishers, NY pp. 555–556 (1993).*

* cited by examiner

*Primary Examiner*—Donald R. Wilson
(74) *Attorney, Agent, or Firm*—Bryan Cave LLP

(57) ABSTRACT

Use of fluorine containing polymers for the preparation of high dry formulations wherein the fluorine containing polymers are based on fluoropolyethers comprising a fluorine containing part $R_F$ and optionally an hydrogenated part $R_H$, the bonds joining the fluorine containing part to the hydrogenated one being an ether —C—O—C—, bond the terminals T being such as to render the structure bi or polyfunctional, making thus possible the cross-linking reaction, the hydrogenated part $R_H$ not containing groups capable of linking by means of hydrogen bonds to basic acceptors.

7 Claims, No Drawings

COATINGS BASED ON FLUOROPOLYETHERS

This is a continuation of U.S. application Ser. No. 08/379,175, filed Jan. 27, 1995, now abandoned.

The present invention relates to "high dry" formulations for preparing paints and coatings in general. It relates in particular to "high dry" compositions based on fluorine containing polymers. As "high dry" we mean formulations wherein the solvent is 20% by weight at most, preferably 10% by weigh. More particularly the object of the present invention relates to compositions suited for top coating, in particular in the car field, endowed with optimal capacity of adhesion to pigment ed bases, high hardness, protective an d antispot properties, scratch resistance, weather-proof and in particular resistant to UV radiation. Moreover the compositions must be usable in field applications, that is outside, assuring high aesthetic qualities, such as high gloss, image definition (DOI), together with the protective function and utilize a little solvent thus reducing the environmental impact. High dry formulations can be used in a range of temperatures generally from 10° C. to 50° C. This however depends on the crosslinking system, as well known, for instance melamines and blocked diisocyanates require higher temperatures.

The use of fluorine containing polymers for preparing coatings is known. These polymers are endowed with very good chemical, thermal and UV resistance and oleo- and water repellence. Known formulations for coating, having a fluorine containing basis, are for instance chlorotrifluoroethylene (CTFE) copolymers with hydrogenated vinylether or vinylesters; or VDF (vinylidenefluoride) polymer or copolymers with tetrafluoroethylene and/or hexafluoropropylene. The former are for instance LUMIFLON® and CEFRAL®, the latter are commercialized for instance as KYNAR® and TECNOFLON®. The main drawback of these fluoropolymers is that they are employed at high dilutions, even of 90% by weight of solvent. This leads to high costs for eliminating the solvents, since the solvents needed for preparing the formulations of these fluorine containing polymers have a high environmental impact.

In the case of TECNOFLON®-based coatings, chlorofluorocarbon solvents, which will be no longer used according to the laws of all countries, are presently used. In conclusion, these fluorine containing polymers even though endowed with the indicated excellent properties, cannot be used for high dry formulations.

The use of partially fluorinated copolymers is also known in the art, for instance perfluoropolyethers of elastomeric or filming type, are crosslinkable depending on the molecular weight and on the ratio between fluorine containing part and hydrogenated part.

However these products need to be used at high dilutions. Moreover, weather stability is not good. Therefore it is not possible to prepare high dry formulations from these products.

Coatings based on polyesters from perfluoropolyethers and coatings based on perfluoropolyethers containing acrylic groups are also known. One can see European patent applications 622353 and 622391 in the name of the Applicant. These products give good coatings and allow the use of less solvent than the products of the art indicated above. However it is not possible to obtain high dry formulations from these products since they require an amount of solvent of about 50% by weight.

The use of water coatings is also known. These formulations contain a low amount of solvent, of about 10%, whereby they could fall within high dry formulations, however they are endowed with low chemical resistance and moreover do not show the high aesthetic and mechanical properties, such as the gloss and the hardness that the high quality coatings must have.

Solvent-less coatings are also known, that is homogeneous bicomponent compositions without solvents or having a limited amount of solvents, applicable by means of traditional techniques and therefore endowed of minimum environmental impact. Epoxy resins can be mentioned. These resins however lead to poor coatings (coatings of inferior quality) from the aesthetic point of view. For instance the gloss of the coatings is of the order of 10–20 at 60° C. according to ISO 2813 standard. These compositions, however, do not yield reduced coating thicknesses, lower than 50 $\mu$, as required for top coating. Moreover the finishing of these products is not very good.

Object of the present invention is obtaining "high dry" formulations based on fluorine containing polymers capable of giving crosslinked films having the combination of properties indicated above: very good chemical, mechanical, thermal properties and resistance to UV radiations, usable also for applications on the field, very good aesthetic and durability properties, scratch and spot resistance.

The Applicant has unexpectedly and surprisingly found that it is possible to prepare "high dry" formulations based on fluoropolyethers if functionalized fluoropolyethers, as defined hereinunder, are used.

It has been surprisingly found that the polymers based on fluoropolyethers as defined be low do give "high dry" formulations since they require the addition of small amounts of solvent, of about 10% by weight and generally lower than 20% by weight.

Object of the present invention are high dry formulations of fluorine containing polymers for preparing paints and coatings wherein the fluorine containing polymers are based on fluoropolyethers comprising a fluorine containing part $R_F$ and optionally a hydrogen containing part $R_H$, the bonds joining the fluorine containing part to the hydrogen containing one being an ether, C—O—C, bond the terminals T' being such as to render bi or polyfunctional the structure and thus making possible the crosslinking reaction, the hydrogen containing part $R_H$ not containing groups capable of linking by means of hydrogen bonds to basic acceptors.

More in detail, preferred are the fluorine containing products which can be represented with the formula $$T'—(R_H)_x—R_F—(R_H)_x—T' \quad (I)$$

wherein $R_F$ is

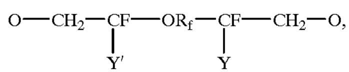

$$O—CH_2—\underset{Y'}{CF}—OR_f—\underset{Y}{CF}—CH_2—O,$$

wherein $R_f$ is a fluoropolyether chain, Y and Y' being same or different from each other and being F or $CF_3$ x is 0 or an integer from 1 to 10, preferably from 1 to 3;

$R_H$ is a linking bivalent radical, of linear aliphatic type—$(CH_2)_m$—, m being an integer from 1 to 20, or of (alkylene)cycloaliphatic type or of (alkylene)aromatic type, optionally having also heteroatoms on the ring or in chain, the number of carbon atoms being from 3 to 20 for the cycloaliphatic compounds, and from 5 to 30 for the aromatic ones; the $R_H$ group can also be a mixture of the types indicated:

$T'=-(CH_2CH_2O)_n-R_H)_{x'}-T$, wherein n is 0 or an integer from 1 to 6, preferably from 1 to 2;

x' is 0 or an integer from 1 to 10, preferably from 1 to 3, x' can be different from x; and T being hydrogen or a terminal capable of rendering bior polyfunctional the structure such as to make it reactive towards both ionic and radical crosslinking agents.

In particular terminals T are preferably of the type:

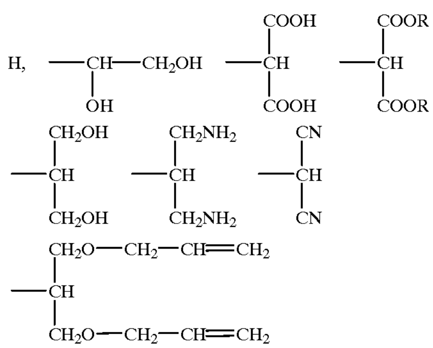

In particular the following groups must be absent from the hydrogen containing part $R_H$: —COOH, —NH—COO—; —NH—CO—NH—; —OH; $—NH_2$; —NH—; CO—NH—.

The radical $R_f$ of number average molecular weight $M_n$ comprised, preferably, from 500 to 5000, more preferably from 700 to 1500, represents a fluoropolyether chain bifunctional radical, comprising as repetitive units sequences of one or more oxyfluoroalkylene units of the type

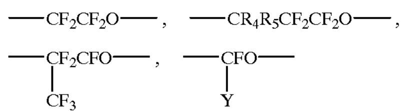

wherein $R_4$ and $R_5$ have the meaning indicated hereafter.

It was unexpectedly found that the fluoropolymers of the present invention by addition of small amounts of solvent lead to the formation of solutions having an extremely low viscosity, generally of the order of 50–300 cPoise at room temperature.

It is even more surprising that amounts of about 2–3% by weight of solvents, selected from those generally used in the paints field are sufficient for obtaining solutions having very low viscosities such as to render them easily utilizable.

The preferred compounds of the formula I are the following:

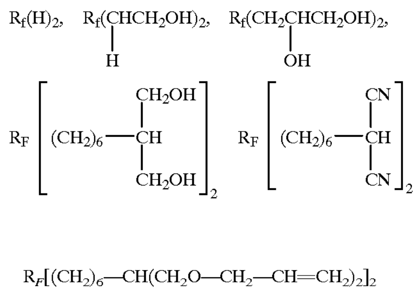

$R_F[(CH_2)_6-CH(CH_2O-CH_2-CH=CH_2)_2]_2$

Generally utilizable solvents are those broadly used in the field of paints. They are fluorine containing solvents containing hydrogen, ketones, esters of heteroalcohols, aromatics. Methyl ethyl ketone, methyl isobutyl ketone, ethyl or butyl acetate, cellosolve acetate, propylenglycolmethylether acetate, xylene are preferred. Chlorofluorocarbons not containing hydrogen are excluded as solvents.

The crosslinking agents used are the commercial ones and however the ones well known for the crosslinking of the crosslinkable functional groups. For instance the polyhydroxylated products of formula (I) are crosslinkable with melamine resins, with weight ratios comprised between 70:30 and 90:10, preferably 80:20, of the polyhydroxylate compound to melamine; the crosslinking temperature is around 130–150° C.

The films obtained are homogeneous and transparent, of good hardness and hydrolysis resistant.

Alternatively the polyhydroxylated polymers are crosslinkable with polyisocyanates containing isocyanurate rings, or using suitable polyisocyanate prepolymers based on isophorondesocyanate (IPDI), toluenediisocyanate (TD), hexamethylendiisocyanate (HMDI), etc. in the presence of metal or amine catalysts, at room temperature or higher, using a NCO/OH ratio for instance from 1/1 to 1.5/1.

Blocked polyisocyanates obtainable from the polyisocyanates indicated above by reaction, for instance, with phenols or ketoxime can be also used. Other kinds of crosslinking are obtained using conventional organic peroxides, for instance, di-ter-butylperoxide, lauroylperoxide, benzoylperoxide.

Other non-peroxide radical initiators, such as for instance AIBN (azabisisobutyronitrile), can also be used.

The excellent properties of viscosity, together with the good compatibility with the solvents of current use in the field of paints and with the various crosslinking agents of paints make the perfluoropolyether polymers of the present invention suitable for formulating high dry paints endowed with good optical and mechanical properties.

The high gloss, high image definition, high adhesion to the various types of supports, good hardness and elasticity in addition to the optimal thermal, chemical and hydrolytic resistances, can be cited.

The advantage obtainable with the compositions of the present invention consists in that very small amounts of solvent are utilized, therefore with a remarkable reduction of the environmental impact and consequently of costs for eliminating solvents and recovery thereof.

The fluorine containing products of the present invention have a very good crosslinking density and then very good mechanical properties and resistance to swelling.

In particular the fluoropolyethers of $R_f$ type utilizable according to the present invention can be of the following types, indicating the repetitive units of the chain:

a) $—(C_3F_6O)_{m'}(CFYO)_{n'}—$ wherein the unit $(C_3F_6O)$ and (CFYO) are perfluorooxyalkylene units statistically distributed along the chain; m' and n' are integers such as to give the molecular weight indicated above, and m'/n' is comprised from 5 to 40, when n' is different from 0; Y is equal to F or $CF_3$; n' can be also 0;

b) 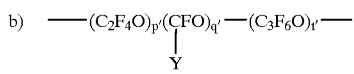

wherein p' and q' are integers such that p'/q' varies from 5 to 0.3, preferably 2.7–0.5 and such that the molecular weight is the one indicated above; t' being an integer with the meaning of m', Y=F or $CF_3$; t' can be 0 and q'/q'+p'+t' lower or equal to 1/10 and the ratio t'/p' is from 0.2 to 6;

c) $—CR_4R_5CF_2CF_2O—$ wherein $R_4$ and $R_5$ are same or different from each other and selected from H, Cl, the molecular weight being that indicated above, a fluorine atom of the perfluoromethylene unit can be replaced by H, Cl or perfluoroalkyl.

The indicated fluoropolyethers are obtainable with the processes well known in the art, for instance, U.S. Pat. Nos. 3,665,041, 2,242,218, 3,715,378 and European patent EP 239,123. The functionalized fluoropolyethers are obtained for instance according to EP Patents 148,482, U.S. Pat. No. 3,810,874.

The fluoropolyethers of the present invention, in particular the fluorine containing polymers of formula (I) are obtained from the functionalized products, in particular from those with hydroxylic ending, according to the process indicated hereinunder.

The functionalized fluoropolyethers according to the present invention can be mixed in various ratios with bi or polyfunctional polyols having a hydrogen containing basis, for instance butanediol, trimethylolpropane, pentaerithrol. The ratio in equivalents of the hydrogen containing polyol to the fluorine containing polymers of the invention varies from 0.1 to 5, with the proviso that the hydrogen containing polyols are soluble in the formulation. In this way blends having specific properties depending on the particular type of the desired coating, are obtained.

The process for preparing the functionalized perfluoropolyethers of the present invention comprises: etherification of fluoropolyether having hydroxilic ends by salification of fluoropolyether and nucleophilic reaction with alkyl or aryl dihalides or pseudohalides, obtaining a fluorine containing polymer A') of formula corresponding to (I) wherein T' is replaced by X, the terminal X being susceptible of further nucleophilic attack; subsequent functionalization by nucleophilic attack of A') with compounds containing carboanions to obtain the compound of formula corresponding to (I) containing the T terminal. Then optionally transformation of the functional T groups of ester type to other groups such as alcohols, amines, acids according to well known reactions.

The fluoropolyethers having hydroxyl terminals, for instance of $Z^2$, $P^2$ and $A^2$ type (reported hereinunder) are obtainable according to known processes. For instance, $Z^2$ is obtainable by reduction of the corresponding diester according to U.S. Pat. No. 3,810,874; $A^2$ by salification of $Z^2$ and reaction with ethylene oxide. Similarly one can obtain the compounds with fluorooxyalkylene units specified above for all the products $Z^2$, $P^2$ and $A^2$ type.

In particular the process comprises:

1° step) Direct etherification of the fluoropolyether with hydroxyl terminals, according to a pattern of nucleophilic substitution, Williamson type. In practice, the fluoropolyether (PFPE) with hydroxyl terminals is dissolved in a solution of potassium or sodium alcoholate in the corresponding alcohol, obtaining the alcoholate of the fluoropolyether. This is slowly added to t-butanol, or other solvent (for instance dioxane), containing a large excess of alkyl or aryl dihalide or pseudohalide.

Typically in this phase 1,4-dibromobutane, 1,5-dibromopentane, 1,6-dibromohexane, 1,8-dibromooctane, 1,10-dibromodecane and other higher or lower homologous compounds with bromides or chlorides terminals, can be used as reactants. 1,4-cyclohexanedimethanol dimesylate or ditosylate, mixtures of $\alpha,\alpha'$ dibromo or dichloro xylene or their pure isomers can also be used. The reaction temperature, depending on the halide reactivity, is comprised from +30 to +90° C. and the reaction time is 1–8 hours. The fluoropolyethers, alkylated with conversion near 100%, are isolated by precipitation in $H_2O$ and filtration or distillation of by-products and reactants in excess. The residue or the filtrate corresponds to the general formula ($A^1$) (specific product of $A^3$ type defined further on), which is the same as (I) wherein the terminal is X (instead of T). X is still a reactive replaceable terminal being of the —Br, —Cl, —$OSO_2CH_3$,

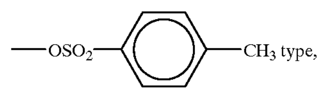

2° step) Functionalization. By using active methylene compounds, such as for instance ethyl or methyl malonate or ethyl or methyl 1,1,2 ethanetricarboxylate when a higher final functionality is desired, or still polyols partially protected such as glycerol formal. The reaction of the PFPE adduct of formula $A^1$, obtained in step 1, with active methylene compounds occurs easily and with high yields. The adduct ($A^1$) is added slowly to an alcoholic solution for instance of sodium or potassium malonate, at a temperature of 40–80° C. heating for 2–8 hours. The polyfunctionalized adduct I (specific product of the $B^2$ type defined hereafter), is the product of formula (I) wherein the terminal T contains COOR wherein PFPE=R, as defined above, $R_H$ being the alkylene residue of the halide, R being $CH_2CH_3$ or $CH_3$ of the malonate. This adduct I is isolated, with practically quantitative yields, by extraction with $H_2O$ and distillation of the solvents and reactants in excess. Optionally from the adduct I it can be obtained the release of other reactive functions, typically by reduction of the carboxylic esters for instance with $LiAlH_4$/THF or by hydrogenation, or still by extension of the carboxyls with sterically hindered dialcohols (for instance neopentylglycol), by ammonolysis and reduction to give polyamine or simply by hydrolysis to give polyacids.

The adducts of type (I) obtained by polyfunctionalization with partially protected polyols, can lead to PFPE polyols for instance by releasing the acetal by hot treatment with mineral acids.

The partially fluorine containing resins so obtained having alcohol, amine, acid or other functionality, can be titrated easily for determining equivalent weight and functionality, for instance with the phenylisocyanate method or with alcoholic HCl or alcoholic KOH.

The final functionality of the resin of formula (I) so obtained is in any case 2 or higher, for instance 4 and 6.

Some examples are given hereinafter only for illustrative purposes and are not intended to be limitative of the scope of the invention.

EXAMPLE 1

20 g of a perfluoropolyoxyalkylene of formula $$HO(CH_2CH_2O)_nCH_2CF_2O(CF_2CF_2O)_p(CF_2O)_qCF_2CH_2(OCH_2CH_2)_nOH \quad (A^2)$$

having p/q=1, and n=1.8 and having a number average molecular weight Mn 1250 and functionality 1.95, are dissolved in 100 ml of a mixture 1/1 of 1,1,2-trichloro-1,2,2-trifluoroethane and toluene. 20 ml of a 50% by weight aqueous solution of potash and 200 mg of tetrabutylammonium hydrogen sulphate are added to said solution, the whole mixture is left under vigorous mechanical stirring for 15 minutes at 20° C. for obtaining the $A^2$ alcoholate. Then a solution of 6.20 g of tosylchloride is dripped in 10 ml of toluene in half an hour. The reaction is followed by TLC (thin liquid chromatography) until the tosylchloride disappears (about 1 hour), afterwards the phases are separated and the organic phase is evaporated, recovering 23 g of an oil corresponding to the following formula

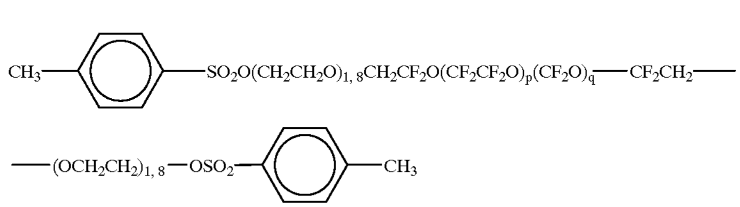

determined by NMR.

Similar results can be obtained by dissolving the fluoropolyether in pyridine at 0° C. and adding the solid tosylchloride (24 hours).

Afterwards, 200 ml of anydrous ethanol and 3.98 g of metal sodium are loaded in a 500 ml 3 necks glass flask, equipped with a reflux condenser and with nitrogen valve, a plug and a 250 ml dropping funnel.

Once the sodium is dissolved, 25.62 ml of ethyl malonate are added and after 5 minutes it is heated to 80° C. Then 100 g of fluoropolyether of formula ($A^3$) are added from the dripper. After 4 hours the cold alcoholic solution is discharged in acid $H_2O$ and the fluorine containing oil recovered as precipitate and purified by distillation of the malonate excess.

90 g of compound of formula

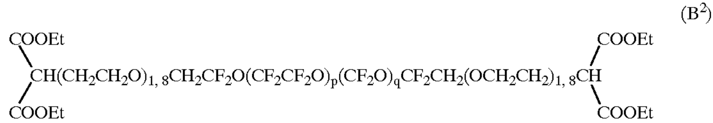

are isolated.

Into a 1 liter 3 necks flask equipped with mechanical stirring, reflux condenser, nitrogen valve and 250 ml dropping funnel, 200 ml of a 1 molar solution of $LiAiH_4$ in THF are loaded. A solution of 80 g of compound ($B^2$) dissolved in 200 ml of anhydrous THF is gradually added to the $LiAlH_4$ solution at a temperature of 50–60° C.

After 12 hours the reaction is over and the oil is recovered by extraction of the solvents and of the by-products with acidic $H_2O$.

68 g of compound of formula

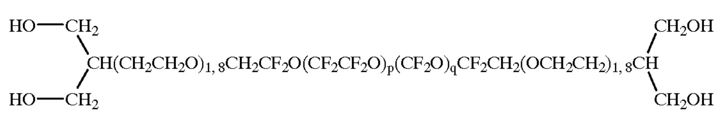

are recovered.

This polyol was titrated by the phenylisocyanate method and resulted to have an equivalent weight 385.

The viscosity rheological characteristics depending on temperature and solvent percentage are reported in Table 1.

The polyol ($C^1$) was crosslinked at 150° C., by catalysis of PTS (paratoluenesulphonic) acid, with melamine resins type CYMEL® 303 (of Cyanamid) with a weight ratio of 70:30, giving an homogeneous and transparent film. The amount of solvent required for reducing the viscosity, for preparing the formulation, comprising in this case the polyol and the crosslinking agent, and for homogenizing the two components, was 5 by weight of MIBK.

EXAMPLE 2

Into a 2 l and 2 necks flask (reflux condenser with nitrogen flask and 1 l dropping funnel) equipped with magnetic stirrer, 280 ml of 1,6 dibromohexane and 100 ml of t-butanol are loaded. A solution of 40 g of potassium t-butylate in 700 ml of t-butanol containing 150 g of a fluoropolyether of formula:

$$(Z^2)\ HOCH_2CF_2O(CF_2CF_2O)_p(CF_2O)_qCF_2CH_2OH$$

having p/q=0.77, number average molecular weight Mn 1000 and functionality 1.96, was dripped in 4 hours into the solution in the flask, kept at 80° C. 2 hours after the dripping end the pH of the solution is neutral. Then the by-product salt (KBr) is filtered and t-butanol and 1,6 dibromohexane in excess are recovered by distillation. The fluorine containing oil (180 g) corresponding to the structure $$(D^2)\ Br—(CH_2)_6—OCH_2CF_2O\ (CF_2CF_2O)_p(CF_2O)_qCF_2CH_2O—(CH_2)_6—Br$$

is obtained as residue.

Similarly to what reported for the malonation reaction in Example 1, 100 g of the oil ($D^2$) are treated with 44.5 ml of ethyl malonate in a solution of 5.9 g of sodium in 300 ml of anhydrous ethanol.

103 g of oil having the structure:

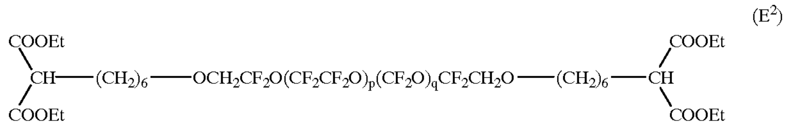

are recovered.

100 g of tetraester ($E^2$) are reduced with 200 ml of a 1M $LiAlH_4$ solution in THF further diluted with 200 ml of THF at 60° C., similarly as in Example 1.

80 g of compound of formula

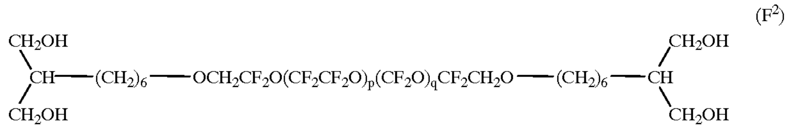

having equivalent weight 388, are recovered.

The viscosity and solubility characteristics are reported in Table 1.

Crosslinking Test 1

The polyol ($F^2$) was crosslinked in 1 hour at 90° C., 100 ppm of dibutyltindilaurate DBTDL as catalyst, with a a prepolymeric crosslinking agent having an isocyanic basis, constituted by 1 mol of trimethylolpropane and 3 moles of isophor-onediisocyanate (prepolymer TMP/IPDI) in butylacetate, maintaining a NCO/OH ratio about 1.1/1. The butylacetate solvent was used in amounts equal to 10% by weight related to the formulation, made by fluorine containing polymer and crosslinking agent.

The characteristics of the obtained film, homogeneous and transparent, are the following:

| | |
|---|---|
| Adhesion to Al (ISO 2409) | 100% |
| Hardness (Bucholtz, ISO 2815) | 70 |
| Gloss (ISO 2813, 60°) | 78 |
| Folding resistance (MU 515) | <3.17 mm |
| MEK Test (to check crosslinking) | >100 double strokes |

Crosslinking Test 2

The polyol ($F^2$) was crosslinked under the same previous conditions with a prepolymer based on trimethylolpropane and 2.4-toluenediisocyanate (prepolymer TMP/TDI) in a solution containing 18% by weight, related to the formulation, of a solvent consisting in a mixture of butyl acetate and PMA (propyleneglycol methylether acetate).

The film looks like in the previous test and has the following properties:

| | |
|---|---|
| Adhesion to Al (ISO 2409) | 100% |
| Hardness (ISO 2815) | 75 |
| Gloss (ISO 2813) | 80 |
| Folding (MU 515) | <3.17 mm |
| MEK Test | >100 double strokes. |

EXAMPLE 3

According to example 2, 150 g of fluoropolyether ($Z^2$) are treated with 450 g of 1,10 dibromodecane, 40 g of potassium t-butylate and 800 ml of t-butanol. 185 g of adduct $$(G^2)Br—(CH_2)_{10}—OCH_2CF^2O(CF_2CF_2O)_p(CF_2O)_qCF_2CH_2O—(CH_2)_{10}—Br$$

are recovered.

100 g of ($G^2$) are treated with 29 g of diethyl malonate, 3.85 g of sodium and 200 ml of ethanol to give 105 g of tetraester

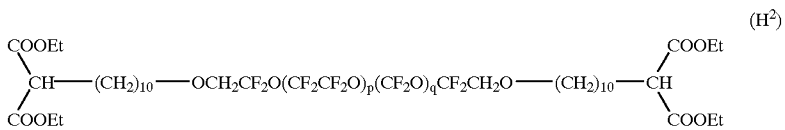

100 g of tetraester ($H^2$) are at last reduced with $LiAlH_4$/THF according to the usual modalities to give 82 g of tetraol of formula $$(HOCH_2)_2CH-(CH_2)_{10}-OCH_2CF_2O(CF_2CF_2O)_p(CF_2O)_qCF_2CH_2O-(CH_2)_{10}-CH(CH_2OH)_2 \quad (I^2)$$

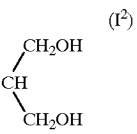

which, titrated with phenylisocyanate, results to have an equivalent weight 358.

This polyol looks like a wax solid at room temperature (because of melting around +30° C., evident in DSC), soluble in most of the conventional organic solvents (see Table 1) because of the hydrogen containing and fluorine containing mixed composition of the chain. The product is miscible both with hydrogenated polyols (for instance trimethylolpropane) and with fluorinated diols, such as perfluoropolyether having hydroxyl terminals, from which $Z^2$ derives. In this way blends as indicated below can be obtained.

The characteristics of some films obtained by the formulations with tetraol ($I^2$), trimethylolpropane and fluoropolyether diols type $Z^2$ are reported hereinafter.

Blend 1

The tetraol ($I^2$) is mixed with the fluoropolyether diol ($Z^2$), the ratio in hydroxyl equivalents being 1:1. It is mixed and then crosslinked with the crosslinking prepolymer TMP/IPDI (maintaining a ratio in equivalents NCO/OH of about 1.1/1), in a solution containing 15% by weight, related to the formulation, of butyl acetate containing 100 ppm of DBTL (catalyst).

The limpid solution was crosslinked at 90° C. for 60 minutes.

An homogeneous and transparent film is obtained, having the properties:

| | |
|---|---|
| Adhesion to Al (ISO 2409) | 100% |
| Hardness (ISO 2815) | 60 |
| Gloss (ISO 2813) | 75 |
| Folding (MU 515) | <3.17 mm |
| MEK Test | >100. |

Blend 2

The tetraol ($I^2$) was mixed with trimethylpropane, the ratio in hydroxyl equivalents being 1:1. It was then treated in butyl acetate (19% by weight related to the formulation) with the crosslinking prepolymer TMP/IPDI (NCO/OH 1.1/1) and crosslinked at 90° C. for 1 hour.

A film is obtained as indicated above, having the following properties:

| | |
|---|---|
| Adhesion to Al (ISO 2409) | 100% |
| Hardness (ISO 2815) | 85 |
| Gloss (ISO 2813) | 82 |
| Folding (MU 515) | <3.17 mm |
| MEK Test | >100. |

Formulation as Such 1)

The tetraol ($I^2$) was crosslinked with the prepolymer TMP/IPDI, maintaining a ratio NCO/OH 1.1/1, in a formulation containing 19% by weight of butyl acetate which contained 100 ppm of DBTL.

A film is obtained as above, having the following properties:

| | |
|---|---|
| Adhesion to Al (ISO 2409) | 100% |
| Hardness (ISO 2815) | 70 |
| Gloss (ISO 2813) | 75 |
| Folding (MU 515) | <3.17 mm |
| MEK test | >100. |

Formulation as Such 2)

The tetraol ($I^2$) was crosslinked with a prepolymer formed by 1 mole of TMP and 3 moles of 2,4-toluenediisocyanate (prepolymer TMP/TDI) with a ratio in equivalents NCO/OH 1.1/1 and in a formulation containing 19% by total weight of solvent (butyl acetate PMA mixture).

The film appears as indicated above, having the following properties:

| | |
|---|---|
| Adhesion to Al (ISO 2409) | 100% |
| Hardness (ISO 2815) | 83 |
| Gloss (ISO 2813) | 84 |
| Folding (MU 515) | <3.17 mm |
| MEK Test | >100. |

Formulation as Such 3)

The tetraol ($I^2$) was mixed without solvent (0% by weight of solvent related to the formulation) with CYMEL® 303, using a weight ratio of 8 to 2 and was crosslinked at 130° C. for 30 minutes by catalysis of p-toluensulphonic acid. The film, homogeneous and transparent, has the following properties:

| | |
|---|---|
| Adhesion to Al (ISO 2409) | 100% |
| Hardness (ISO 2815) | 63 |
| Gloss (ISO 2813) | 78 |
| Folding (MU 515) | <3.13 mm |
| MEK Test | >100. |

EXAMPLE 4

Similarly to the previous examples, 100 g of fluoropolyether diol of formula ($Z^2$) are dissolved with 34 g of potassium t-butylate in 600 ml of t-butanol, then added to a solution of 100 g of 1,4-cyclohexanedimethanol dimesylate

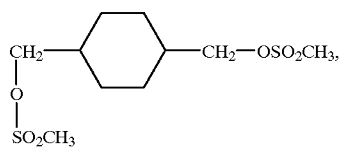

obtained according to what reported in literature (Haggis-Owen, "J. Chem Soc.", 1953, pages 404–407) dissolved in 400 ml of dioxane at 85° C.

After cooling and filtering of the salt and of the dimesylate in excess, 105 g of compound of formula (L[2])

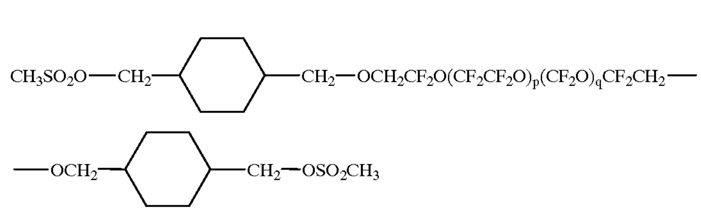

are recovered by evaporation.

100 g of dimesylate (L[2]) are added to a solution of 4.25 g of sodium dissolved in 250 ml of anhydrous ethanol containing 29.1 ml of diethyl malonate to give 95 g of tetraester (M[2]):

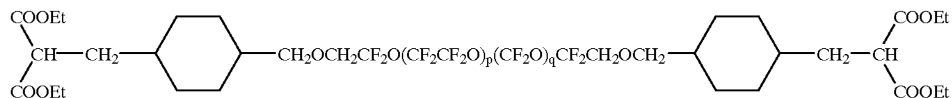

90 g of tetraester (M[2]) are reduced with 150 ml of a 1M $LiAlH_4$ solution in THF diluted with 300 ml of anydrous THF at 55° C., to give 82 g of oil corresponding to the structure (N[2]):

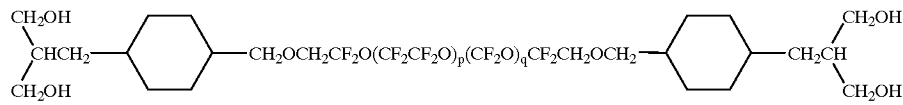

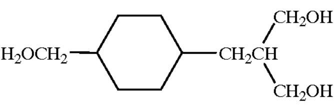

titrated by the phenylisocyanate method, it results to have an hydroxyl equivalent weight of 640.

The rheological and solubility characteristics are summarized in Table 1.

Crosslinking Test 1

The tetraol (N[2]) was crosslinked with a prepolymer TMP/IPDI (ratio NCO/OH 1.1/1) in a formulation containing 15% by weight of butyl acetate as solvent and 100 ppm of DBDTL as catalyst, for 1 hour at 90° C., giving an homogeneous and transparent film having the following properties:

| | |
|---|---|
| Adhesion to Al (ISO 2409) | 100% |
| Hardness (ISO 2815) | 60 |
| Gloss (ISO 2813) | 75 |
| Folding (MU 515) | <3.17 mm |
| MEK Test | >100. |

Crosslinking Test 2

The tetraol ($N_2$) was mixed with the crosslinking melamine resin in a weight ratio 8:2 (CYMEL® 303, Cyanamid) and crosslinked at 130° C. for 30 minutes, with p-toluensulphonic acid as catalyst. No solvent was used with the formulation so obtained. The characteristics of the obtained homogeneous and transparent film are reported:

| | |
|---|---|
| Adhesion to Al (ISO 2409) | 100% |
| Hardness (ISO 2815) | 63 |
| Gloss (ISO 2813) | 75 |
| Folding (MU 515) | <3.13 mm |
| MEK Test | >100. |

Crosslinking Test 3

The tetraol (N[2]) was mixed with the crosslinking prepolymer TMP/TDI (NCO/OH ratio about 1.2/1) in a formulation containing 18% by weight of butyl acetate as solvent and 100 ppm of DBTDL as catalyst and crosslinked 1 hour at 90° C., obtaining an homogeneous and transparent film.

| | |
|---|---|
| Adhesion to Al (ISO 2409) | 100% |
| Hardness (ISO 2815) | 70 |
| Gloss (ISO 2813) | 83 |
| Folding (MU 515) | <3.13 mm |
| MEK Test | >100. |

EXAMPLE 5

The same fluoropolyether diol (Z[2]) of example 2 is mixed with the crosslinking prepolymer TMP/IPDI (NCO/OH 1.1/1) and with 20% of butyl acetate, obtaining a limpid solution. Such solution, containing 100 ppm of dibutyl tin dilaurate as catalyst, is crosslinked at 90° C. for 60 minutes, giving an homogeneous and transparent film, endowed with good adhesion to various sublayers (aluminium, glass, plastic, etc.) and high elasticity (folding resistance and elongations up to 50%).

The film hardness can be obtained from extremely low values of the Bucholtz scale up to 70–80, by admixing variable amounts, from 0 to 10%, of polyfunctional hydrogenated polyols described above, such as the polyols seen in example 3, or also tetraols of formula

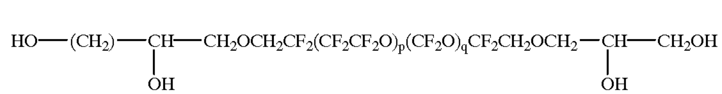

$$HO-(CH_2)-CH(OH)-CH_2OCH_2CF_2(CF_2CF_2O)_p(CF_2O)_qCF_2CH_2OCH_2-CH(OH)-CH_2OH \quad (P^2)$$

The $P^2$ compounds are obtainable according to the usual processes of the organic chemistry, for instance the fluoropolyether diol ($Z^2$) salified with potassium t-butylate in t-butanol, is added to a solution of glycidol in t-butanol at 70° C., and subsequently neutralized.

The rheological and solubility characteristics of $P^2$ are reported in Table 1.

EXAMPLE 6

Example of crosslinking of mixture Z-DOL ($Z^2$)/Z-TETRAOL ($P^2$) with blocked isocyanates.

An equiponderant mixture of $Z^2$ +$P^2$ (3 g) is crosslinked in 30 minutes at 150° C. with 2.8 g of the isocyanurate from the IPDI blocked with ketoxime (commercial product Huels VESTANAT® B 1358) in the presence of DBTDL (0.5% w/w in respect to NCO groups) as catalyst and 20% w/w of butylacetate as solvent in the formulation.

An homogeneous and transparent film having the following properties:

| | |
|---|---|
| Adhesion to Al (ISO 2409) | 100% |
| Hardness (ISO 2815) | 80 |
| Gloss (ISC 2813) | 78 |

-continued

| | |
|---|---|
| MEK Test | >100, |
| is obtained. | |

COMPARATIVE EXAMPLE

Comparative Synthesis of Polyurethane Resin

In a 1 l reactor 150 ml of butyl acetate, 1 mole of isophoron diisocyanate (IPDI) and then 1 mmole of dibutyltin dilaurate (DBTDL) in 5% solution (weight/weight) in butyl acetate are loaded.

The solution is heated to 70° C. and 0.5 moles of Z-DOL of formula $Z^2$ are dripped into it in 2 h. When the dripping is over, the solution is left at 70° C. for 2 additional hours; then the solution containing the isocyanic prepolymer so obtained is discharged into a second reactor containing 150 ml of butyl acetate and 1 mole of trimethylolpropane (TMP).

When the addition is ended, the reaction mixture is left under $N_2$ at 70° C. until the isocyanic groups disappear (by I.R. analysis).

A fluorine containing resin having a dry content of 70% and a viscosity of 1700 cP is obtained.

10 g of the fluorine containing polyurethane resin so obtained, having 70% of dry content in butyl acetate, further diluted in 8 g of a solvent mixture (PMA:butylacetate=3:7), are mixed with 3.48 g of crosslinking polyisocyanate (product Bayer, DESMODUR® N 3300), dissolved in 8 g of the above solvent mixture in order to obtain a final concentration of the solvent equal to 65%, and crosslinked at 90° C. in 1 hour.

If one works at a higher concentration of dry content, the formulation has no rheological characteristics to be used as coating.

TABLE 1

| Ex. | Fluorinated Polymer | Hydroxylic equivalent weight | η (cP, 20° C.) | $C_{1/2}$* | η 10%** | Solvents: Alcohols | Solvents: Ketones, Esters | Solvents: Hydrocarbons |
|---|---|---|---|---|---|---|---|---|
| 1 | $A^2$ | 630 | 144 | 4.1% | 31 | + | + | − |
| | $C^1$ | 385 | 960 | 2.6% | 123 | + | + | − |
| 2 | $Z^2$ | 500 | 103 | 3.5% | 17 | + | + | − |
| | $F^2$ | 388 | 3500 | 2.2% | 280 | + | + | − |
| 3 | $I^2$ | 358 | 2370*** | 2.1%*** | 140*** | + | + | ± |
| 4 | $N^2$ | 640 | 2000 | 2.2% | 130 | + | + | − |
| 5 | $P^2$ | 300 | 2970 | 2.5% | 240 | + | ± | − |

*$C_{1/2}$ is the concentration at which the viscosity of the oil ("dry") is halved (reference solvent MIBK, temperature +20° C.);
**η 10% (10% by weight of MIBK solvent) is the viscosity in cP of a solution having 90% by weight of "dry" in MIBK (T = +20° C.);
***viscosimetric tests carried out at +32° C., i.e. 2° C. above the melting point of the tetraol $I^2$;
+means that the oil (the "dry" according to the present invention) is soluble in the class of the indicated solvents;
−means that the oil is not soluble in the class of the indicated solvents;
±means that the oil is partially soluble, i.e. there exist solubility gaps.

What is claimed is:

1. A process for the preparation of crosslinkable high dry formulations of coatings having a thickness lower than 50$\mu$ and wherein, said formulations including a solvent in a total amount less than 20% by weight of the total formulation, said process comprising mixing a fluorine-containing polymer represented by the formula $$T'-(R_H)_x-R_F-(R_H)_x-T'$$

wherein $R_F$ is $$O-CH_2-\underset{Y'}{\underset{|}{CF}}-OR_f-\underset{Y}{\underset{|}{CF}}-CH_2-O,$$

and wherein:

$R_f$ is a fluoropolyether chain;

Y and Y' are independently F or $CF_3$;

x is an integer from 1 to 10;

$R_H$ is a linking bivalent radical, the bivalent radical being selected from the group consisting of: linear aliphatic radicals—$(CH_2)_m$—, where m is an integer from 1 to 20, cycloaliphatic radicals, aliphatic-cycloaliphatic radicals, aromatic radicals, and aliphatic-aromatic radicals, optionally having heteroatoms, the number of carbon atoms being from 3 to 20 for the cycloaliphatic compounds and from 5 to 30 for the aromatic compounds, and mixtures thereof;

T' is —$(CH_2CH_2O)_n$—$(R_H)_{x'}$—T, wherein n is 0 or an integer from 1 to 6;

x' is 0 or an integer from 1 to 10 and x' is optionally different from x; and

T is hydrogen or a terminal group capable of rendering bifunctional or polyfunctional the structure such as to make it reactive towards both ionic or crosslinking radical agents;

with the solvent and a crosslinking agent for crosslinking the functional group T, the solvent being selected from the group consisting of the following: fluorine containing solvents containing hydrogen, ketones, esters of heteroalcohols and aromatics.

2. The process according to claim 1, wherein $R_f$ represents a fluoropolyether chain bifunctional radical comprising as repetitive units sequences of one or more oxyfluoroalkylene units selected from the group consisting of $$-\underset{CF_3}{\underset{|}{CF_2CFO}}-, \text{ and } -\underset{Y}{\underset{|}{CFO}}-,$$

wherein $R_4$ and $R_5$ are independently H or Cl; and Y is F or $CF_3$.

3. Crosslinkable formulations for coatings having a thickness lower than 50$\mu$, consisting essentially of the fluorine-containing polymers of claim 1 admixed with a solvent elected from the group consisting of the following: fluorine-containing solvents containing hydrogen, ketones, esters of heteroalcohols, and aromatics, the solvent being less than 20% by weight of the total formulation.

4. Formulations according to claim 3, wherein the solvent is less than 10% by weight.

5. Formulations according to claim 3, wherein the solvents are selected from the group consisting of ketones and acetates of heteroalcohols.

6. The process according to claim 1, wherein the terminal groups T are $$H,\quad -\underset{OH}{\underset{|}{CH}}-CH_2OH,\quad -\overset{COOH}{\overset{|}{\underset{COOH,}{\underset{|}{CH}}}}\quad -\overset{COOR}{\overset{|}{\underset{COOR,}{\underset{|}{CH}}}}$$

$$-\overset{CH_2OH}{\overset{|}{\underset{CH_2OH,}{\underset{|}{CH}}}}\quad -\overset{CH_2NH_2}{\overset{|}{\underset{CH_2NH_2,}{\underset{|}{CH}}}}\quad -\overset{CN}{\overset{|}{\underset{CN}{\underset{|}{CH}}}} \text{ or}$$

$$-\overset{CH_2O-CH_2-CH=CH_2}{\overset{|}{\underset{CH_2O-CH_2-CH=CH_2.}{\underset{|}{CH}}}}$$

7. A process for the preparation of high dry formulations of coatings having a thickness lower than 50$\mu$ wherein a fluorine-containing polymer represented by the formula $$O-CH_2-\underset{Y'}{\underset{|}{CF}}-OR_f-\underset{Y}{\underset{|}{CF}}-CH_2-O,$$

and wherein:

$R_f$ is a fluoropolyether chain having a number average molecular weight $M_n$ from 500 to 5000;

Y and Y' are independently F or $CF_3$;

x is an integer from 1 to 10;

$R_H$ is a linking bivalent radical, the bivalent radical being selected from the group consisting of: linear aliphatic radicals —$(CH_2)_m$—, where m is an integer from 1 to 20, cycloaliphatic radicals, aliphatic-cycloaliphatic radicals, aromatic radicals, and aliphatic-aromatic radicals, optionally having heteroatoms, the number of carbon atoms being from 3 to 20 for the cycloaliphatic compounds and from 5 to 30 for the aromatic compounds, and mixtures thereof;

T' is —$(CH_2CH_2O)_n$—$(R_H)_{x'}$—T, wherein n is 0 or an integer from 1 to 6;

x' is an integer from 1 to 10 and x' is optionally different from x; and

T is $$-\overset{COOH}{\overset{|}{\underset{COOH,}{\underset{|}{CH}}}}\quad -\overset{COOR}{\overset{|}{\underset{COOR,}{\underset{|}{CH}}}}\quad -\overset{CH_2OH}{\overset{|}{\underset{CH_2OH,}{\underset{|}{CH}}}}\quad -\overset{CH_2NH_2}{\overset{|}{\underset{CH_2NH_2,}{\underset{|}{CH}}}}$$

$$-\overset{CN}{\overset{|}{\underset{CN}{\underset{|}{CH}}}} \text{ or}\quad -\overset{CH_2O-CH_2-CH=CH_2}{\overset{|}{\underset{CH_2O-CH_2-CH=CH_2}{\underset{|}{CH}}}}$$

wherein R is an ethyl group, is mixed with a solvent and a crosslinking agent for crosslinking the functional Group T, the solvent being selected from the group consisting of the following: fluorine containing solvents containing hydrogen, ketones, esters of heteroalcohols and aromatics, the solvent being less than 20 weight percent of the total formulation.

* * * * *

UNITED STATES PATENT AND TRADEMARK OFFICE
CERTIFICATE OF CORRECTION

PATENT NO. : 6,350,306 B1
DATED : February 26, 2002
INVENTOR(S) : Claudio Tonelli et al.

It is certified that error appears in the above-identified patent and that said Letters Patent is hereby corrected as shown below:

Column 17,
Line 5, please insert -- is -- after "amount";
Line 50, please delete $$-CF_2\underset{\displaystyle CF_3}{\underset{|}{C}}FO- \text{, and } -\underset{\displaystyle Y\text{, -- ;}}{\underset{|}{C}}FO- \text{,}$$

and insert $$-CF_2CF_2O-\text{, } -CR_4R_5CF_2CF_2O-\text{, } -CF_2\underset{\displaystyle CF_3}{\underset{|}{C}}FO-\text{, and } -\underset{\displaystyle Y\text{,}}{\underset{|}{C}}FO-\text{ ,}$$

Column 18,
Line 22, please delete $$O\text{-}CH_2\text{-}\underset{\displaystyle Y'}{\underset{|}{C}}F\text{-}OR_f\text{-}\underset{\displaystyle Y\text{--}}{\underset{|}{C}}F\text{-}CH_2\text{-}O\text{ ,}$$

and insert $$-T' - (R_H)_x - R_F - (R_H)_x - T'$$

wherein $R_F$ is $O\text{-}CH_2\text{-}\underset{\displaystyle Y'}{\underset{|}{C}}F\text{-}OR_f\text{-}\underset{\displaystyle Y\text{--;}}{\underset{|}{C}}F\text{-}CH_2\text{-}O\text{ ,}$ Line 59, please start a new line after "wherein R is an ethyl group,".

Signed and Sealed this

Seventeenth Day of September, 2002

*Attest:*

JAMES E. ROGAN

*Attesting Officer*

*Director of the United States Patent and Trademark Office*